United States Patent Office

3,641,067
Patented Feb. 8, 1972

3,641,067
EPOXIDATION OF OLEFINS WITH THALLIC CARBOXYLATES
Walter M. Kruse, Wilmington, Del., assignor to Hercules Incorporated, Wilmington, Del.
No Drawing. Filed Nov. 3, 1969, Ser. No. 873,671
Int. Cl. C07d 1/08, 1/12
U.S. Cl. 260—348.5 L   6 Claims

ABSTRACT OF THE DISCLOSURE

The process disclosed is one of oxidizing propylene or isobutylene to the corresponding epoxide. The oxidizing agent is a thallic carboxylate, such as thallic acetate, and the epoxide is obtained as principal product by continuously removing the volatile oxidation reaction products from the reaction mixture as the oxidation proceeds. The oxidation may be carried out at a temperature from about 0° C. to about 170° C.

---

This invention relates to the oxidation of olefins. More particularly, it relates to the oxidation of propylene and isobutylene to the corresponding epoxides using thallic carboxylates as oxidizing agents.

Epoxides previously have been produced by a variety of procedures. The most common method comprises contacting an olefin with an oxidizing agent to produce the corresponding epoxide. The oxidizing agents which have previously been employed include hydrogen peroxide, peracids such as peracetic acid, and oxygen in combination with a catalyst. Thallic carboxylates also have previously been used as oxidizing agents but, when used in the oxidation of olefins, the products obtained have been aldehydes, ketones, glycols and esters of such glycols. Using thallic carboxylates as oxidizing agents, it has not previously been possible to obtain epoxides as principal olefin oxidation products.

Now, in accordance with this invention, it has been found that epoxides can be obtained as the principal reaction products in the oxidation of propylene and isobutylene with thallic carboxylates by continuously and immediately removing from the reaction mixture, as the oxidation proceeds, those oxidation reaction products which are volatile under the conditions of the reaction. Such volatile products are inclusive of the propylene oxide and isobutylene oxide which are the principal oxidation products from the process of this invention. Ordinarily, a solvent mixture is used in the reaction to maintain the thallic carboxylate in solution, and the volatile oxidation products may be removed by vaporization of one or more components of the solvent mixture. Preferably, however, the volatile products are removed by using sufficient propylene or isobutylene to effect sparging of the volatile products from the reaction mixture. Alternatively, an inert gas such as nitrogen may be used to effect sparging of the volatile products from the reaction mixture.

The process of this invention is illustrated in the following examples.

EXAMPLE 1

The reaction of this example was carried out in an apparatus consisting mainly of a train of four capped tubes linked by 18 gauge stainless steel tubing. The first tube in the series was fitted with a 24 gauge needle extending to near the bottom of the capped tube and fitted with tubing for introduction of the olefin. The second tube in the series was cooled by an ice bath and the third and fourth tubes in the series were cooled in Dry Ice. To the first tube in the series was charged six milliliters of a 0.75 molar slurry of thallic acetate in a solvent consisting of 10 percent acetic acid, 20 percent water and 70 percent tetrahydrofuran by volume. The tube was provided with a magnetic stirrer and pressurized with 30 pounds per square inch of propylene for about 30 minutes at 20° C. During this time, the thallic acetate dissolved completely.

The reaction mixture than was brought to 70° C., and propylene was sparged through the mixture at a rate of 50 milliliters per minute for a period of 15 minutes. At the end of this time, four milliliters of liquid had collected in the first receiver and two milliliters of liquid had collected in the second receiver. Analysis of these liquids by vapor phase chromatography showed the presence of 1.5 millimoles propylene oxide and 0.32 millimole of acetone in the first receiver and 0.26 millimole of propylene oxide and 0.08 millimole of acetone in the second receiver. It also was determined that 0.28 millimole of propylene glycol monoacetate was present in the reaction mixture. Thus, the total oxidation product contained 72.1 mole percent propylene oxide, 16.4 mole percent acetone and 11.5 mole percent propylene glycol monoacetate. The ratio of propylene oxide to acetone was 4.4 to 1.

EXAMPLE 2

Following the procedure of Example 1, dioxane and t-butanol each was substituted for the tetrahydrofuran as a solvent component. In each case, the yield and ratio of propylene oxide to acetone were essentially the same as in Example 1.

EXAMPLE 3

Following the procedure of Example 1, isobutylene was substituted for propylene. The thallic acetate dissolved completely within a few minutes under a pressure of 10 pounds per square inch of isobutylene. After sparging the reaction mixture for 30 minutes with isobutylene, analysis established that the oxidate was composed of 82 mole percent isobutylene oxide, 15 mole percent of isobutylene glycol monoacetate and 3 mole percent isobutyraldehyde.

The thallic carboxylates utilized in the process of this invention may be derived from any aliphatic monocarboxylic acid containing from 1 to 4 carbon atoms. Thus, the acid may be formic, acetic, propionic, butyric or isobutyric acid. Preferred acids utilized in formation of the thallic salts are acetic acid and propionic acid. The thallic carboxylate is ordinarily in solution in a solvent mixture, and the olefin is intimately contacted with said solution.

The solvent mixture used in the process of this invention is composed of water, an aliphatic monocarboxylic acid containing 1 to 4 carbon atoms, as described in the preceding paragraph, and a water-miscible organic solvent component. The latter may be a cyclic ether such as tetrahydrofuran, dihydropyran, 1,4-dioxane or 1,3-dioxane, or an aliphatic ketone such as acetone, methyl ethyl ketone or diethyl ketone, or an aliphatic nitrile such as acetonitrile or propionitrile, or an N-alkyl-substituted aliphatic amide such as dimethyl formamide, diethyl formamide or dimethyl acetamide, or a tertiary aliphatic alcohol such as t-butanol.

The water-miscible organic solvent component also may be a glycol ether such as diethylene glycol, ethylene glycol monomethyl ether, ethylene glycol monoethyl ether, ethylene glycol dimethyl ether, ethylene glycol diethyl ether, diethylene glycol monomethyl ether, diethylene glycol monoethyl ether, diethylene glycol mono-n-butyl ether or diethylene glycol diethyl ether. It may also be a glycol ester such as ethylene glycol monoacetate, ethylene glycol diacetate, diethylene glycol monoacetate or diethylene glycol diacetate. By-products of the oxidation reaction also may be present in the solvent mixture. Permissibly present in the case of propylene oxidation are 1,2-propylene glycol and its monoesters, for example, its monoacetic acid or monopropionic acid esters, and 1,2-isobutylene glycol and its monoesters, and isobutyraldehyde, in the case of isobutylene oxidation.

In the oxidation of propylene, the solvent mixture may contain from about 10 to about 20 percent water, from about 5 to about 20 percent of the aliphatic monocarboxylic acid and from about 60 to about 80 percent of the water-miscible organic solvent component. In the oxidation of isobutylene, the water content can vary from about 10 to about 50 percent, the aliphatic monocarboxylic acid content from about 5 to about 80 percent and the water-miscible organic solvent component content from 0 to about 85 percent. These amounts are by weight based on the weight of the solvent mixture. The amount of thallic carboxylate in the solvent mixture can be from about 0.1 to about 1.5 molar in the case of oxidation of isobutylene. In the oxidation of propylene the amount of thallic carboxylate can be from about 0.1 to about 0.8 molar. In any event, the thallic carboxylate is furnished in an amount up to the stoichiometric amount in relation to the amount of olefin. This is consistent with the formation of a hydroxy-thallation adduct with the olefin, which adduct is subsequently decomposed. In the case of thallic acetate and propylene, and in the presence of water, the adduct formed is believed to have the structure

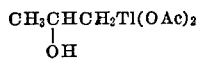

The temperature at which the oxidation process is carried out can be varied over a wide range, but generally will be within the range of from about 0° to about 170° C. The reaction can be carred out in two stages, namely, forming the hydroxy-thallation adduct by absorbing the olefin in the solvent mixture containing the thallic carboxylate at about 0° to 35° C., and then heating the reaction mixture to a temperature of about 65° to about 170° C. to decompose the adduct while removing the volatile oxidation products as rapidly as they are formed, for example, by sparging the reaction mixture with a gas. A preferred procedure is to maintain the reaction temperature within the range of from about 65° C. to about 170° C. throughout the reaction, continuously introducing the olefin and removing the volatile oxidation products from the reaction zone as they are formed.

Thus, for continuous operation, the propylene or isobutylene may be passed, preferably countercurrently to the flow of thallic carboxylate solution, through a series of reactors containing the thallic carboxylate solution. Between reactors, the volatile oxidation products are condensed from the gas stream exiting from one reactor before the gas stream enters the next reactor. The separation of the propylene or isobutylene epoxide from the other volatile reaction products can then be accomplished by fractional distillation. The reduced thallium salt can be reoxidized in a separate step by any desired means, i.e. electrolytically or chemically, before being recycled to the reaction system, or it can be reoxidized continuously in the system by, for example, electrolytic oxidation.

What I claim and desire to protect by Letters Patent is:

1. The process of oxidizing an olefin selected from the group consisting of propylene and isobutylene to the corresponding epoxide as the principal reaction product which comprises intimately contacting said olefin with a thallic carboxylate derived from an aliphatic monocarboxylic acid containing 1 to 4 carbon atoms, said thallic carboxylic being in solution in a solvent mixture comprising water, an aliphatic monocarboxylic acid containing 1 to 4 carbon atoms and a water-miscible organic solvent, and continuously removing the volatile oxidation products from the reaction mixture as the oxidation proceeds.

2. The process of claim 1 wherein said volatile oxidation products are removed from the reaction mixture by sparging said reaction mixture with the olefin being oxidized.

3. The process of claim 1 wherein said volatile oxidation products are removed from the reaction mixture by sparging said reaction mixture with an inert gas.

4. The process of claim 1 wherein the oxidation is carried out at a temperature from about 0° C. to about 170° C.

5. The process of claim 1 wherein propylene is oxidized to propylene oxide and the solvent mixture comprises from about 10 to about 20% water, from about 5 to about 20% of the aliphatic monocarboxylic acid and from about 60 to about 80% of the water-miscible organic solvent.

6. The process of claim 1 wherein the epoxide is separated from other volatile oxidation reaction products by fractional distillation.

References Cited

UNITED STATES PATENTS 3,020,293  2/1962  Schonberg et al. ___ 260—348.5
3,048,636  8/1962  Grinstead _____ 260—586 B
3,436,409  4/1969  Hill et al. _____ 260—348.5

NORMA S. MILESTONE, Primary Examiner

U.S. Cl. X.R.

260—597 R, 488 R

PO-1050
(5/69)

UNITED STATES PATENT OFFICE
CERTIFICATE OF CORRECTION

Patent No. 3,641,067          Dated February 8, 1972

Inventor(s) Walter M. Kruse (Case 1)

It is certified that error appears in the above-identified patent and that said Letters Patent are hereby corrected as shown below:

Column 4, Claim 1, line 18 and 19;
    "oxidation products" should read --oxidation reaction products--

Column 4, Claim 1, line 15;
    "carboxylic" should read --carboxylate--

Signed and sealed this 20th day of June 1972.

(SEAL)
Attest:

EDWARD M. FLETCHER, JR.
Attesting Officer

ROBERT GOTTSCHALK
Commissioner of Patents